United States Patent
Zhang

(10) Patent No.: US 10,998,573 B2
(45) Date of Patent: May 4, 2021

(54) LITHIUM BATTERY PACKAGE

(71) Applicant: Ningbo Zhongpeng Lithium Energy Technology Co., Ltd., Zhejiang (CN)

(72) Inventor: Hepeng Zhang, Zhejiang (CN)

(73) Assignee: Ningbo Zhongpeng Lithium Energy Technology Co., Ltd., Ningbo (CN)

( * ) Notice: Subject to any disclaimer, the term of this patent is extended or adjusted under 35 U.S.C. 154(b) by 150 days.

(21) Appl. No.: 16/199,208

(22) Filed: Nov. 25, 2018

(65) Prior Publication Data
US 2020/0091548 A1 Mar. 19, 2020

(30) Foreign Application Priority Data
Sep. 13, 2018 (CN) .......................... 201811066066.5

(51) Int. Cl.
| | |
|---|---|
| *H01M 10/0525* | (2010.01) |
| *H01M 10/42* | (2006.01) |
| *H01R 13/11* | (2006.01) |
| *H02J 7/00* | (2006.01) |
| *H01M 50/20* | (2021.01) |

(52) U.S. Cl.
CPC ..... *H01M 10/0525* (2013.01); *H01M 10/425* (2013.01); *H01M 50/20* (2021.01); *H01R 13/11* (2013.01); *H02J 7/0013* (2013.01); *H01M 2220/30* (2013.01)

(58) Field of Classification Search
CPC .... H01M 2/1077; H01M 10/425; H01M 2/10; H01R 27/00
See application file for complete search history.

(56) References Cited

U.S. PATENT DOCUMENTS

| | | | |
|---|---|---|---|
| 2013/0136965 A1* | 5/2013 | Nakano | H01M 2/1077 429/92 |
| 2014/0154532 A1 | 6/2014 | Chellew | |
| 2017/0110709 A1 | 4/2017 | Kolden et al. | |
| 2018/0198292 A1 | 7/2018 | Lee et al. | |

FOREIGN PATENT DOCUMENTS

| | | |
|---|---|---|
| CN | 203013831 U | 6/2013 |
| CN | 103828087 A | 5/2014 |
| CN | 104103798 A | 10/2014 |
| CN | 104578249 A | 4/2015 |
| CN | 207489961 U | 6/2018 |
| JP | 2017084591 A | 5/2017 |

* cited by examiner

*Primary Examiner* — Ladan Mohaddes

(57) ABSTRACT

The present invention discloses a lithium battery package comprising a housing (100), a lithium battery pack and a circuit board (400), wherein the lithium battery pack comprises a lithium battery holder (200) and a number of lithium cells (300) mounted within the lithium battery holder (200), and two sides of the lithium battery holder (200) are mounted respectively with metal pin means (500) coupled with the lithium cells (300), wherein the housing (100) is provided with a charging adaptor (111); a bottom portion at each side of the charging adaptor (111) is provided with a chute (115) along its length direction; a front end of the charging adaptor (111) is provided with six charging sockets (112); the housing (100) is further provided with a locking structure for locking an electric lood.

9 Claims, 12 Drawing Sheets

A

LITHIUM BATTERY PACKAGE

CROSS REFERENCES TO RELATED APPLICATION

This application claims priority of Chinese Patent Application No. 201811066066.5 filed on Sep. 13, 2018, the entire content of which is hereby incorporated by reference.

TECHNICAL FIELD

The present invention belongs to the field of new energy, and more particularly, to a lithium battery package.

BACKGROUND ART

A conventional chargeable electric drill comprises an electric drill body and a lithium battery package provided at a lower portion of the electric drill body and used for providing energy to the electric drill body. Typically, the lithium battery package comprises a housing, a lithium battery pack provided inside the housing, and a circuit board mounted above the lithium battery pack and used for controlling the charging and discharging thereof. Here, the lithium battery pack comprises a number of lithium cells and a lithium battery holder into which the lithium cells may be mounted.

Generally, the present lithium battery package is provided on a charging adaptor thereof with four charging sockets, which correspond, one by one, to the charging base and charging sheets of the electric tool. As there is a difference in the distance between charging sheets of different electric tools, one lithium battery package can only be used with a corresponding charging base, such that the range of application of the lithium battery package is rendered small.

SUMMARY OF THE INVENTION

It is an object of the present invention to provide a lithium battery package. The lithium battery package is provided with six charging sockets, such that the lithium battery package is capable of supplying power to various electric tools, thereby expanding the range of application of the lithium battery package.

The above object of the present invention is achieved through the following technical solution:

A lithium battery package comprising a housing, a lithium battery pack and a circuit board, wherein the lithium battery pack comprises a lithium battery holder and a number of lithium cells mounted within the lithium battery holder, and two sides of the lithium battery holder are mounted respectively with metal pin means coupled with the lithium cells, wherein the housing is provided with a charging adaptor; a bottom portion at each side of the charging adaptor is provided with a chute along its length direction; a front end of the charging adaptor is provided with six charging sockets; the housing is further provided with a locking structure for locking an electric lood.

Figure 1:
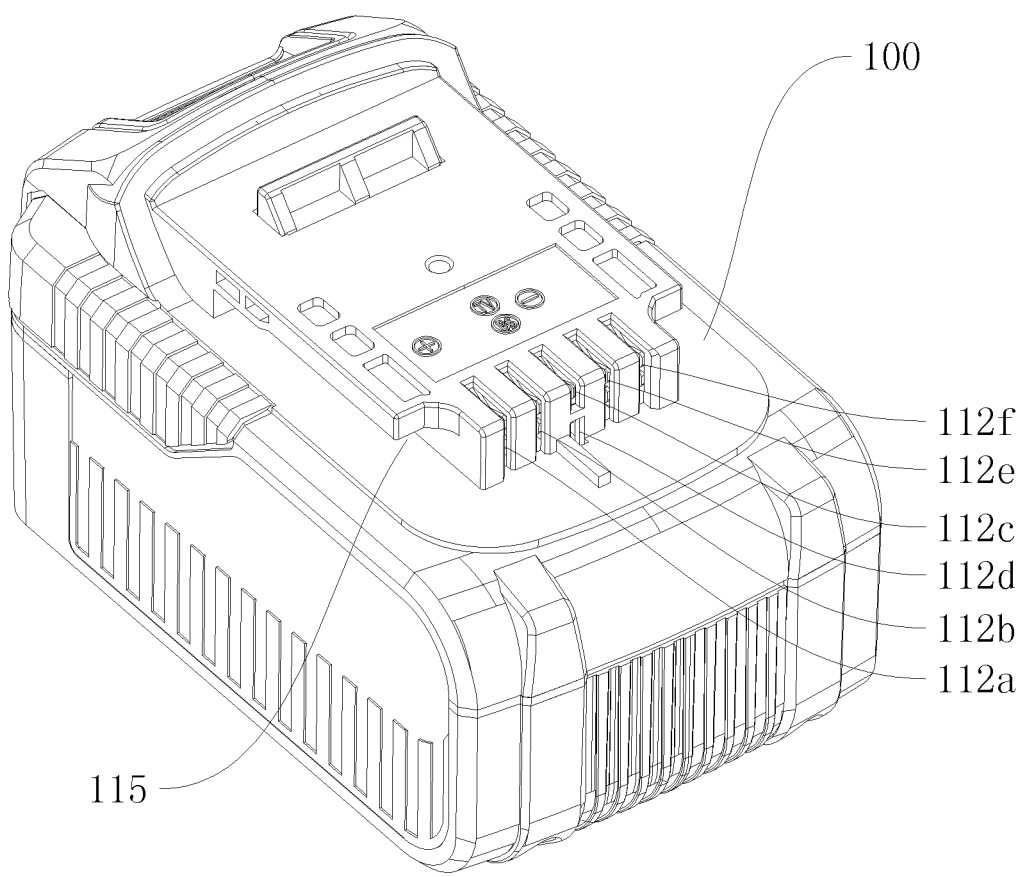
FIG. 1 is a structural schematic diagram of a lithium battery package of the present invention.

In the figures, various components are illustrated using the following reference numerals: 100—housing; 110—upper housing; 111—charging adaptor; 112—charging socket; 112a—first socket; 112b—second socket; 112c—third socket; 112d—fourth socket; 112e—fifth socket; 112f—sixth socket; 113—locking port; 114—depressing port; 115—chute; 120—lower housing; 121—fixing through-hole; 122—heat dissipation slot; 123—heat dissipation port; 130—locking member; 131—depressing plate; 132—locking hook; 133—spring insertion post; 140—return spring; 150—protective external shield; 151—fixing block; 152—fixing bar; 200—lithium battery holder; 201—placement groove; 202—arcuate convex portion; 203—arc-section gap; 204—first opening; 205—second opening; 206—fixing stud; 207—supporting post; 208—positioning post; 209—mounting base; 209a—connection opening; 209b—tab limiting groove; 210—positioning insertion post; 211—supporting rib plate; 212—positioning groove; 220—left holder; 221—buckle base; 231—right holder; 231—insertion buckle; 300—lithium battery; 400—circuit board; 410—fixing through-hole; 420—fixing screw; 430—positioning hole; 440—plugging through-slot; 450—thermistor; 460—charging-discharging connector; 461—resilient charging clip; 500—metal pin element; 501—lateral single-pin element; 502—lateral double-pin element; 503—extending single-pin element; 503a—fuse through-hole; 504—extending double-pin element; 510—fixing plate; 520—plugging tab; 521—limiting lug; 530—connection portion; 540—positioning through-hole; 550—arcuate portion.

DETAILED DESCRIPTION OF THE INVENTION

The present invention is further to be described below in detail in conjunction with the accompanying drawings.

Figure 2:
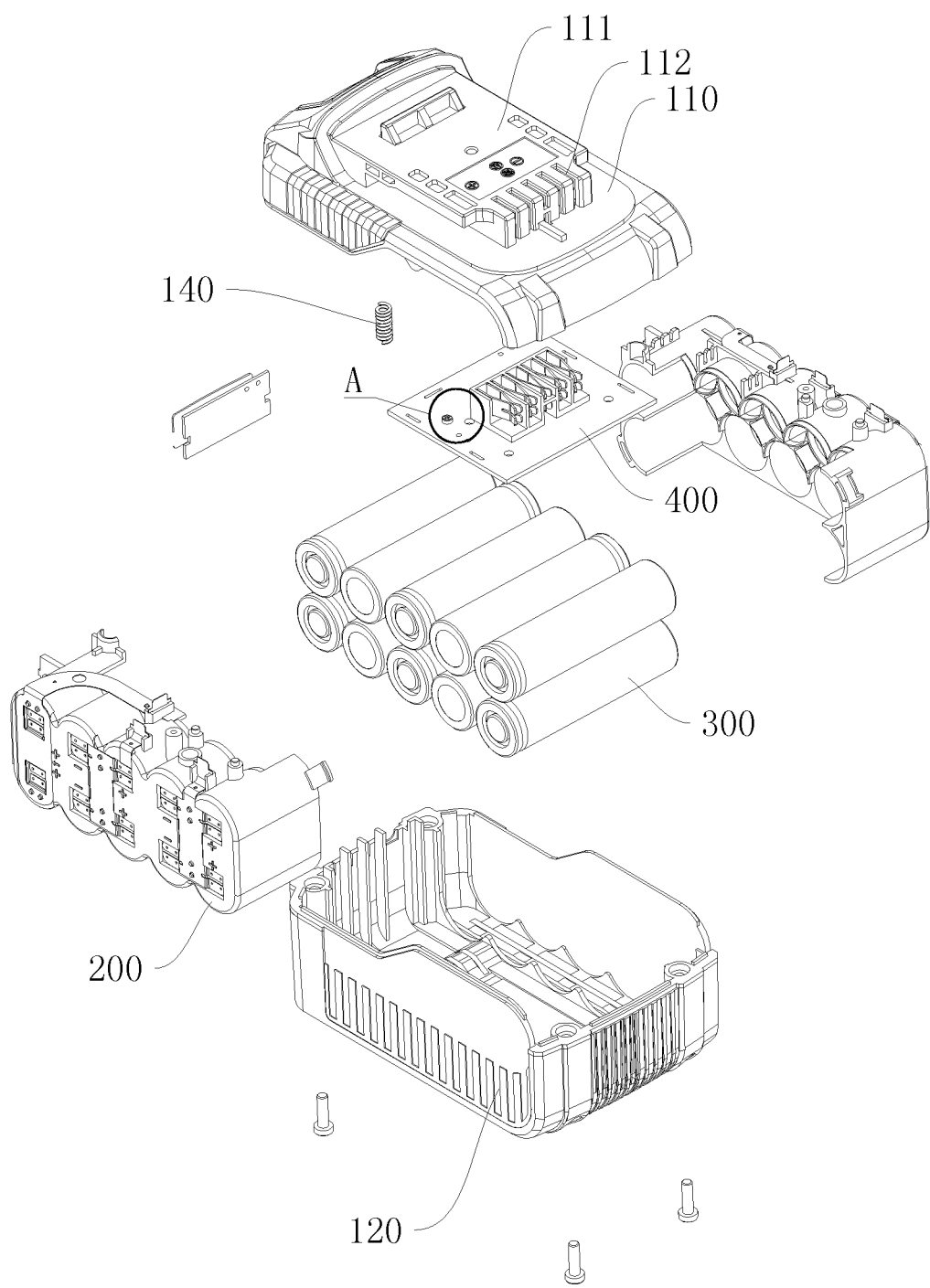
FIG. 2 is a structural schematic diagram of the lithium battery package of the present invention in an exploded state.

Referring to FIGS. 1 and 2, a lithium battery package is provided, which comprises a housing 100, a lithium battery pack and a circuit board 400, wherein the lithium battery pack comprises a lithium battery holder 200 and a number of lithium cells 300 mounted within the lithium battery holder 200. In this embodiment, the lithium battery pack has ten lithium cells 300, wherein every two cells are connected in parallel to constitute a set, and the sets of lithium cells 300 are successively connected in series by means of the circuit board 400.

Figure 4:
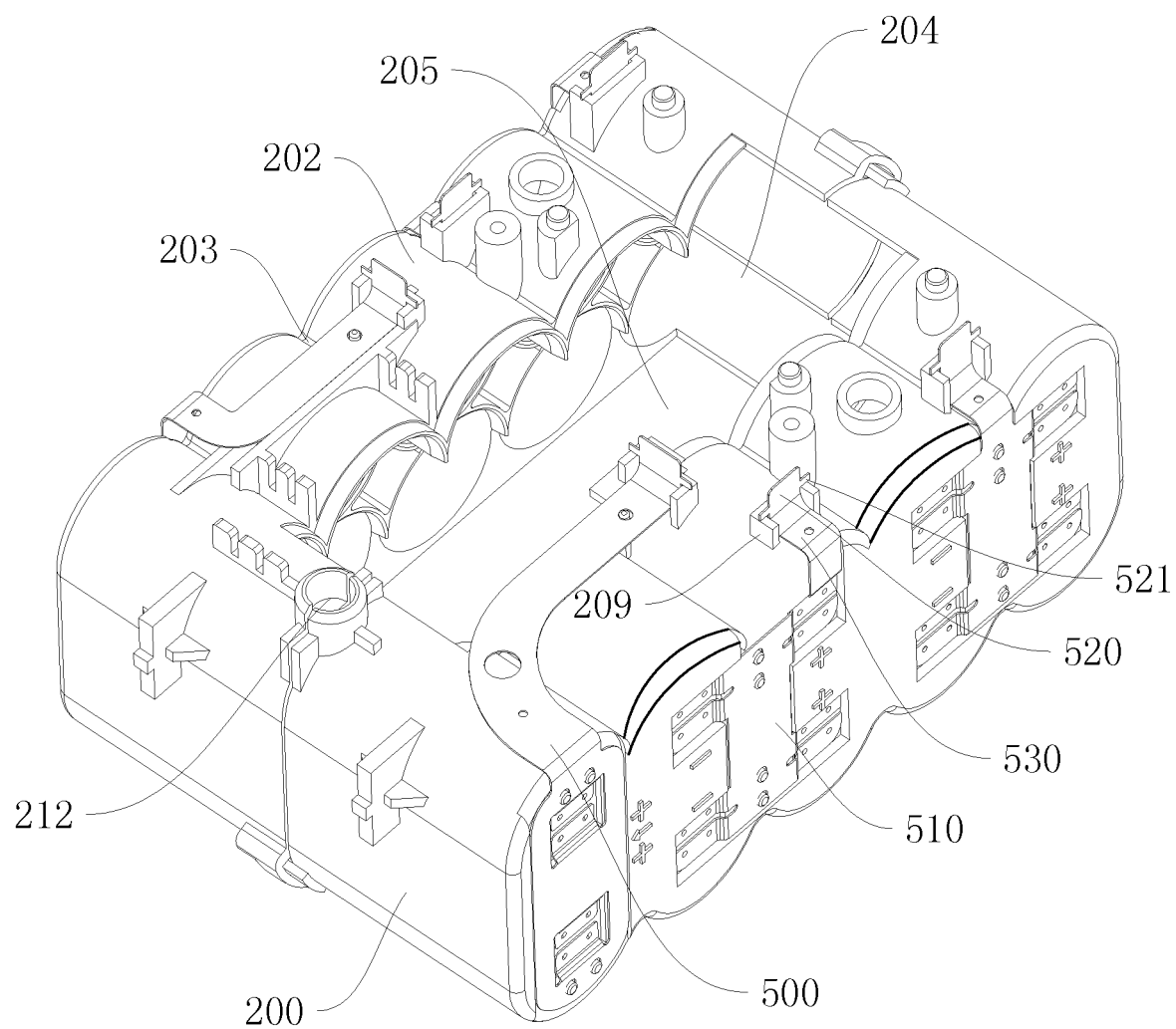
FIG. 4 is a structural schematic diagram of a lithium battery holder of the present invention.
Figure 5:
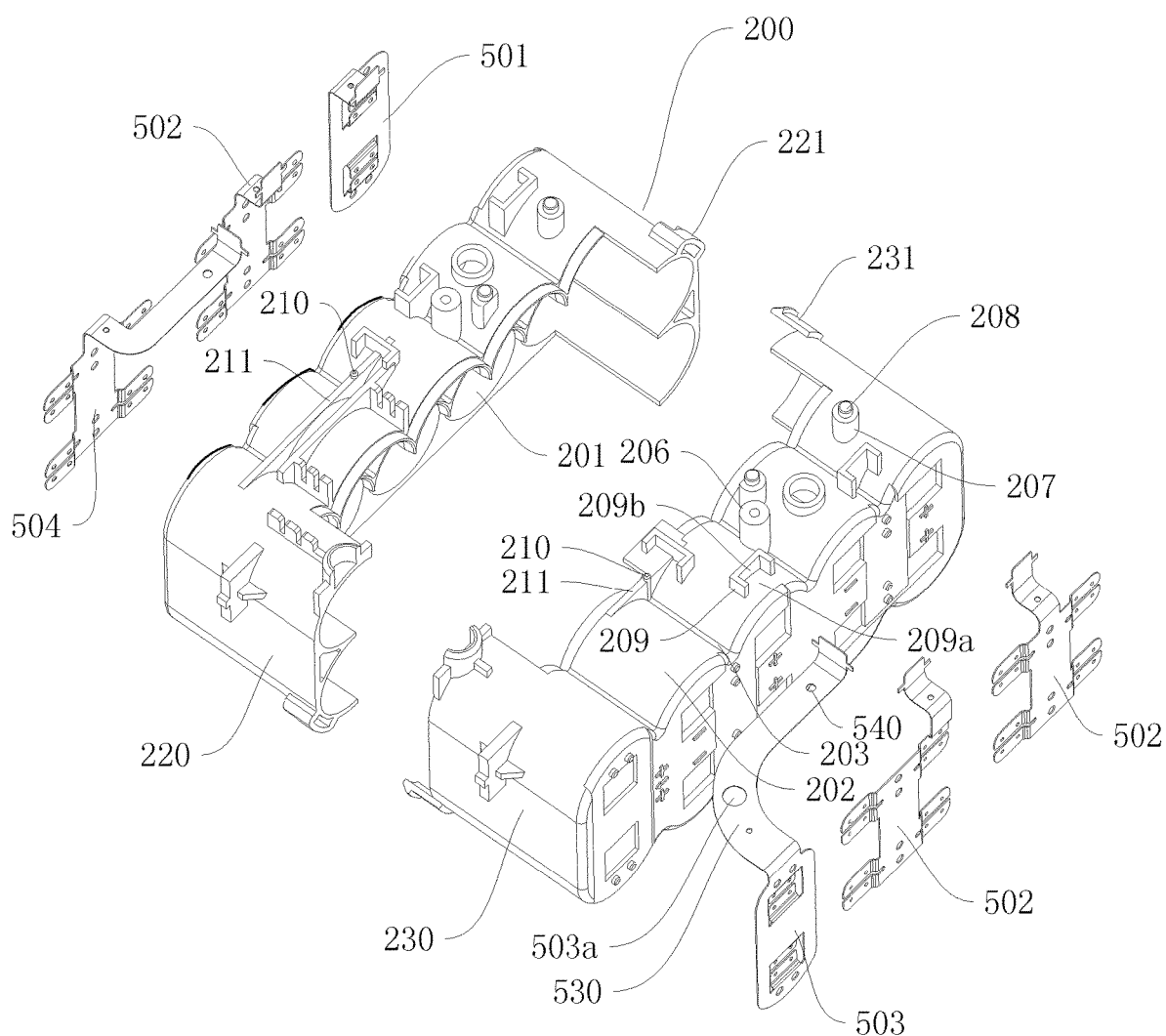
FIG. 5 is a structural schematic diagram of the lithium battery holder of the present invention in an exploded state.

Referring to FIGS. 4 and 5, the lithium battery holder 200 comprises a left holder 220 and a right holder 230, and both the left holder 220 and the right holder 230 are provided correspondingly with a plurality of placement grooves 201 into which the lithium cells 300 can be inserted and fixed. In order to match the lithium cells 300 in shape, the lithium battery holder 200 has a top portion formed with a plurality of arcuate convex portions 202 corresponding one by one to the lithium cells 300. In this embodiment, the lithium battery holder 200 has top portion formed with five arcuate convex portions 202 along the length direction, and an arc-section gap 203 is formed between each pair of adjacent ones of the arcuate convex portions 202.

Here, the left holder 220 and the right holder 230 are detachably connected to each other with snap-on means. In this embodiment, each of the front and rear ends of the left holder 220 is provided with a buckle 221 for the snap-on means, and the right holder 230 is provided with a tongue 231 capable of being inserted into and fixed together with the buckle 221.

After the left holder 220 and the right holder 230 are fixed together, a first rectangular opening 204 open to the lithium battery pack is formed centrally through the top portion of the whole lithium battery holder 200, and a second rectangular opening 205 open to the lithium battery pack is also formed centrally through the bottom portion of the whole lithium battery holder 200.

Figure 6:
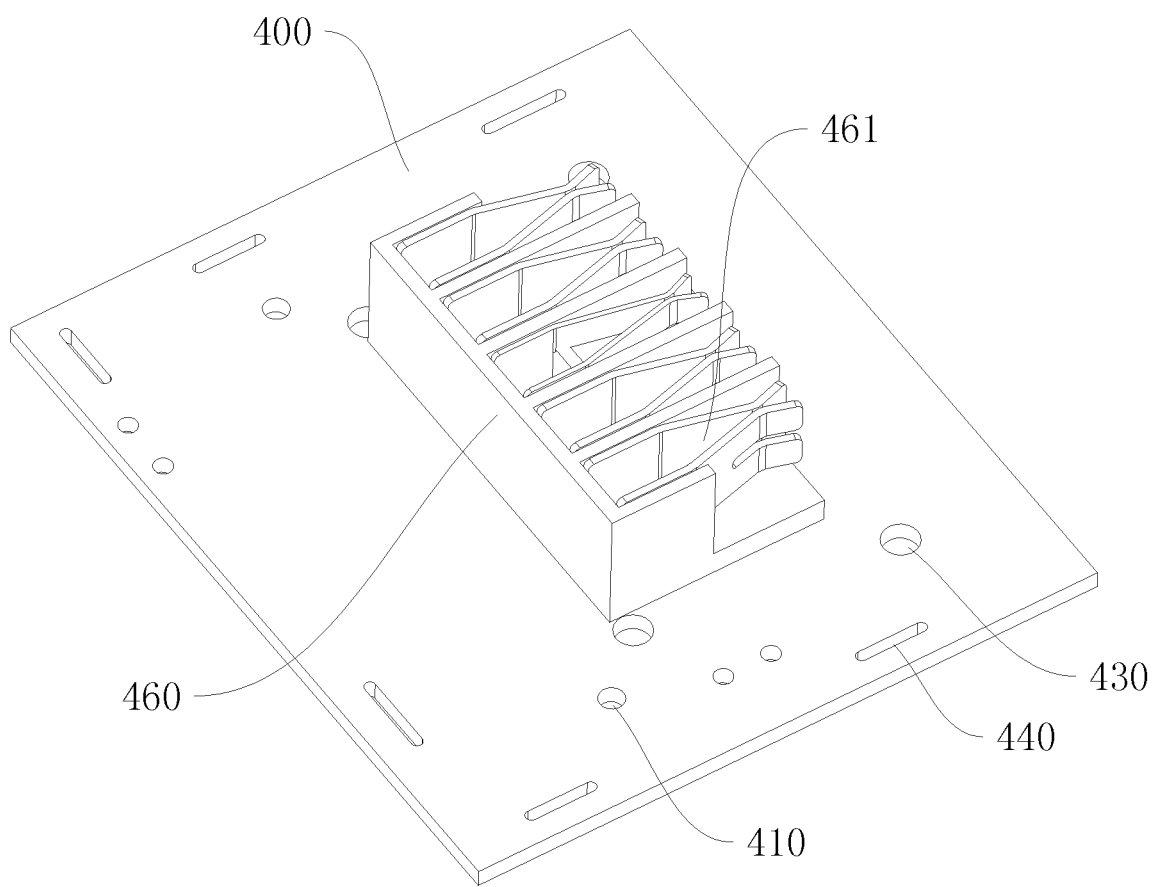
FIG. 6 is a structural schematic diagram of a front side of a circuit board of the present invention.

Referring to FIGS. 5 and 6, the circuit board 400 is disposed at one end on the top portion of the lithium battery holder 200, and the circuit board 400 is narrower than the lithium battery holder 200. In this embodiment, the circuit board 400 is centered to the arcuate convex portions 202.

The top portion of the lithium battery holder 200 is provided with at least two studs 206, the circuit board 400 is provided with fixing through-holes 410 corresponding to the studs 206, the fixing through-holes 410 is narrower than the studs 206, and the studs 206 abut against the bottom portion of the circuit board 400. The circuit board 400 is fixed to the top portion of the lithium battery holder 200 by means of screws 420 mated into the fixing studs 206. In this embodiment, each of the left holder 220 and the right holder 231 of the lithium battery holder 200 is provided with a stud 206. Correspondingly, the circuit board 400 is provided with two fixing through-holes 410.

Figure 3:
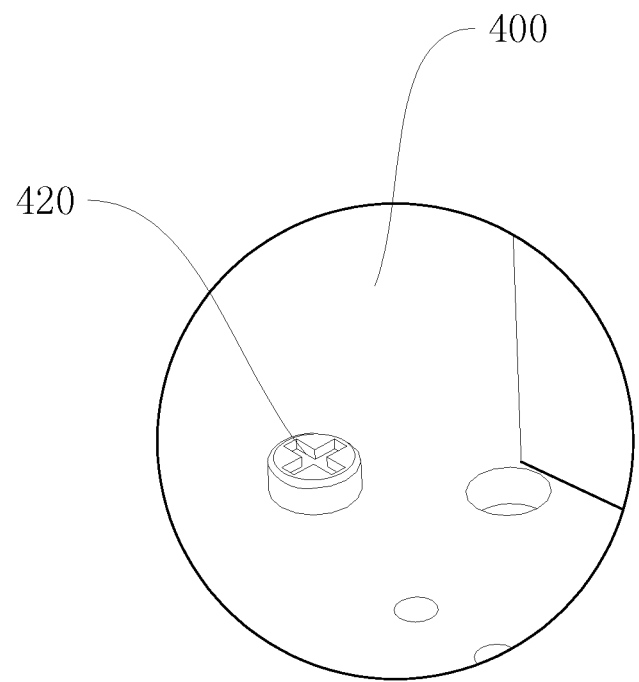
FIG. 3 is an enlarged diagram of Detail A in FIG. 2.

Referring to FIGS. 3, 5 and 6, the lithium battery holder 200 is further provided with a number of posts 207 for abutting against the bottom surface of the circuit board 400, wherein a top portion of each supporting post 207 is provided with a positioning post 208, the circuit board 400 is provided with a positioning hole 430 into which the positioning post 208 is inserted. The cooperation of the positioning post 208 with the positioning hole 430 can improve the mounting strength of the whole circuit board 400 on the top portion of the lithium battery holder 200, thereby reducing the probability of loosening between the circuit board 400 and the lithium battery holder 200 in a vibration condition.

Referring to FIGS. 4, 5 and 6, the lithium battery holder 200 and the circuit board 400 are coupled with each other by means of a metal pin means 500. Here, the metal pin means 500 mainly comprises a fixing plate 510 fixed on each side of the lithium battery holder 200, a plugging tab 520 connected with the circuit board 400 and a connection portion 530 connecting the fixing plate 510 and the plugging tab 520. The circuit board 400 is provided with a plugging through-slot 440 into which the plugging tab 520 is inserted; the lithium battery holder 200 is further provided with a mounting base 209 for fixing the plugging tab 520, wherein the mounting base 209 is provided with a connection opening 209a into which the connection portion 530 projects, and a tab limiting groove 209b against which two sides of the plugging tab 520 abuts.

The plugging tab 520 is provided on each side thereof with a lug 521 that abuts against both of the top surface of the mounting base 209 and the bottom surface of the circuit board 400. The lug 521 is pressed tightly against the top surface of the mounting base 209 by the circuit board 400, which can not only improve the mounting strength of the lug 521, but also make it convenient for an installer to weld the plugging tab 520 to the circuit board 400.

Referring to FIGS. 5 and 6, the metal pin means 500 comprises lateral pin means that are located on two sides of the circuit board 400 and extending pin means that are not located on two sides of the circuit board 400. Based on the number of sets of lithium cells that are connected, the lateral pin means may be divided into a lateral single-pin element 501 and a lateral double-pin element 502, and the extending pin elements may also be divided into an extending single-pin element 503 and an extending double-pin element 504. In this embodiment, as the lithium battery package has five sets or couples of lithium cells 300, a side wall of the left holder 220 is provided successively with a lateral single-pin element 501, a lateral double-pin element 502 and an extending double-pin element 504, and a side wall of the right holder 231 is provided successively with a lateral double-pin element 502, a lateral double-pin element 502 and an extending single-pin element 503.

Here, the connection portion 530 of each extending pin element is provided with a positioning through-hole 540, and the top portion of the lithium battery holder 200 is provided with a positioning insertion post 210 inserted into the through-hole. In order to enhance the support of the lithium battery holder 200 for the extending pin element, on the top portion of the lithium battery holder 200, a supporting rib plate 211 is provided on each side of the positioning insertion post 210 for abutting against the bottom portion of the extending pin element. In this embodiment, the positioning insertion posts 210 of the left holder 220 and the right holder 231 are both disposed at one side adjacent to the circuit board 400 and located in two arc-section gaps 203. Moreover, rib plates 211 are disposed in the arc-section gaps 203 of the left holder 220 that are not disposed to be directly opposite to the circuit board 400, and a rib plate 211 is disposed in the arc-section gap 203 of the right holder 231 that is located at a side remote to the circuit board 400 and not disposed to be directly opposite to the circuit board 400.

In order to achieve the connection between the lithium battery pack and the circuit board 400, the connection portion 530 of the extending single-pin element 503 and the connection portion 530 of the extending double-pin element 504 are each provided with an arcuate portion 550, wherein the connection portion 530 of the extending single-pin element 503 and the connection portion 530 of the extending double-pin element 504 each have a width that remains unchanged, and the extending single-pin element 503 is provided at the arcuate portion 550 thereof with a fuse through-hole 503a. Owing to the arrangement of the fuse through-hole 503a, the effective resistance cross-sectional area of the extending single-pin element 503 at the fuse through-hole 503a is reduced, such that the resistance of the extending single-pin element 503 at the fuse through-hole 503a is increased. Moreover, the extending single-pin element 503 is made from a low-melting-point alloy. As such, in case that the lithium battery package is short-circuited, the extending single-pin element 503 would fuse at the fuse through-hole 503a for protection of the lithium battery package.

Figure 7:
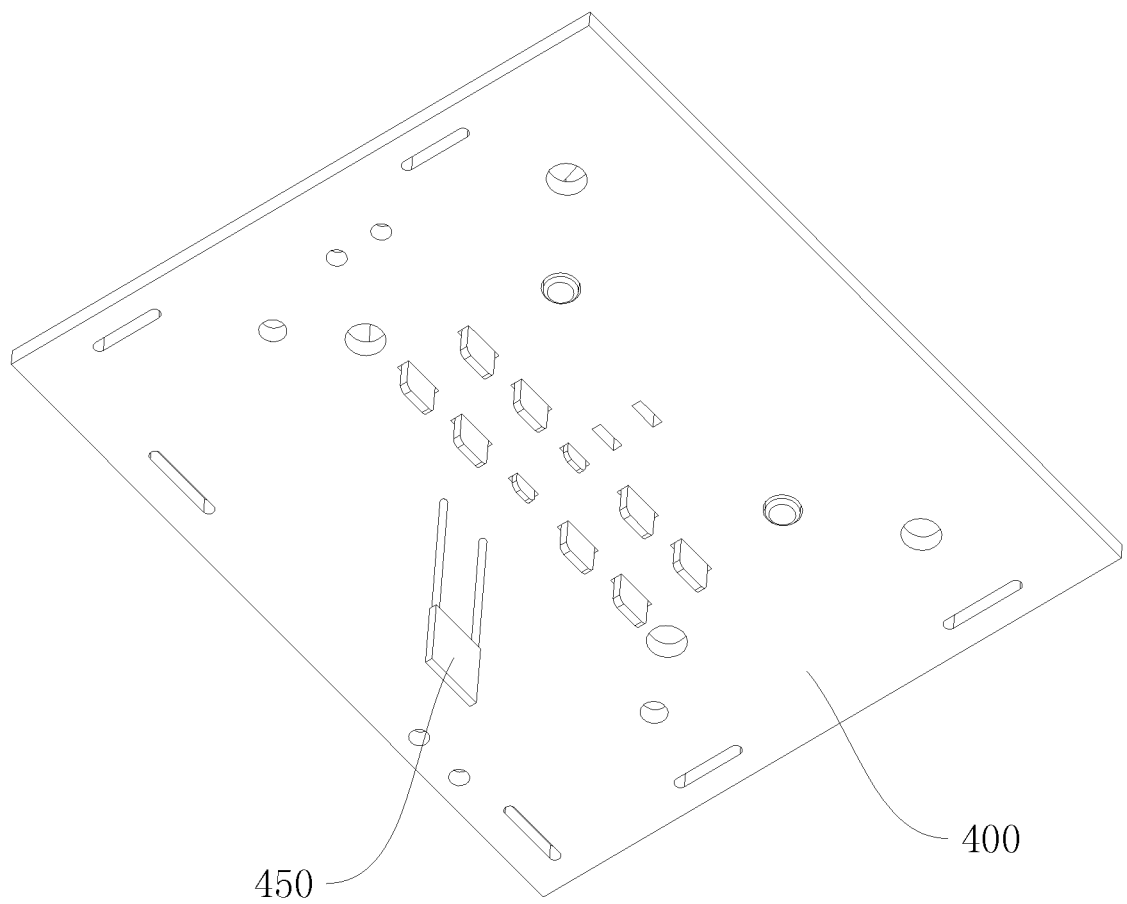
FIG. 7 is a structural schematic diagram of a back side of the circuit board of the present invention.

Referring to FIG. 7, the circuit board 400 is further provided with a thermistor 450 for detecting the temperature inside the lithium battery package. Chinese utility model No. CN207489961U discloses a method for mounting a thermistor. Specifically, the thermistor is mounted on the lithium battery holder. However, with such a mounting method, the temperature measured for lithium cells 300 within the lithium battery package may not be the hottest. Therefore, in the present invention, a thermistor 450 is mounted under the circuit board 400 and inserted into the gap between horizontally adjacent lithium cells 300. Moreover, the thermistor 450 is disposed between the middle portions of the lithium cells 300 (see FIG. 2), and abuts against neither of the two adjacent lithium cells 300.

Referring to FIG. 6, the top portion of the circuit board 400 is further provided with a connector 460 for coupling a charger, wherein the connector 460 is provided with a number of resilient charging clips 461 disposed in a side-by-side manner. In this embodiment, the connector 460 is provided with five clips 461 disposed in a side-by-side manner.

Referring to FIGS. 1 and 2, the housing comprises an upper housing 110 and a lower housing 120, which are connected and fixed together by means of screws.

The upper housing 110 is provided on a top portion thereof with a charging adaptor 111 disposed to be directly opposite to the connector 460, and the charging adaptor 111 is provided with charging sockets 112 corresponding one by one to the resilient charging clips 461. In this embodiment, a front end of the charging adaptor 111 is provided with six charging sockets 112, and comprises, in sequence, a first socket 112*a*, a second socket 112*b*, a third socket 112*c*, a fourth socket 112*d*, a fifth socket 112*e* and a sixth socket 112*f*, wherein the third socket 112*c* and the fourth socket 112*d* are disposed side by side in a vertical direction. Moreover, a bottom portion at each side of the charging adaptor 111 is provided, along its length direction, with a chute 115 for facilitating insertion of a charger. Here, the third socket 112*c* is a temperature communication socket, the fourth socket 112*d* is a battery ID socket, and other sockets all are power supply sockets.

In this embodiment, the space between adjacent ones of the charging sockets 112 is 4.5 mm, the charging adaptor 111 has a width of 34.5 mm, and the chute 115 has a depth of 6.28 mm.

Figure 8:
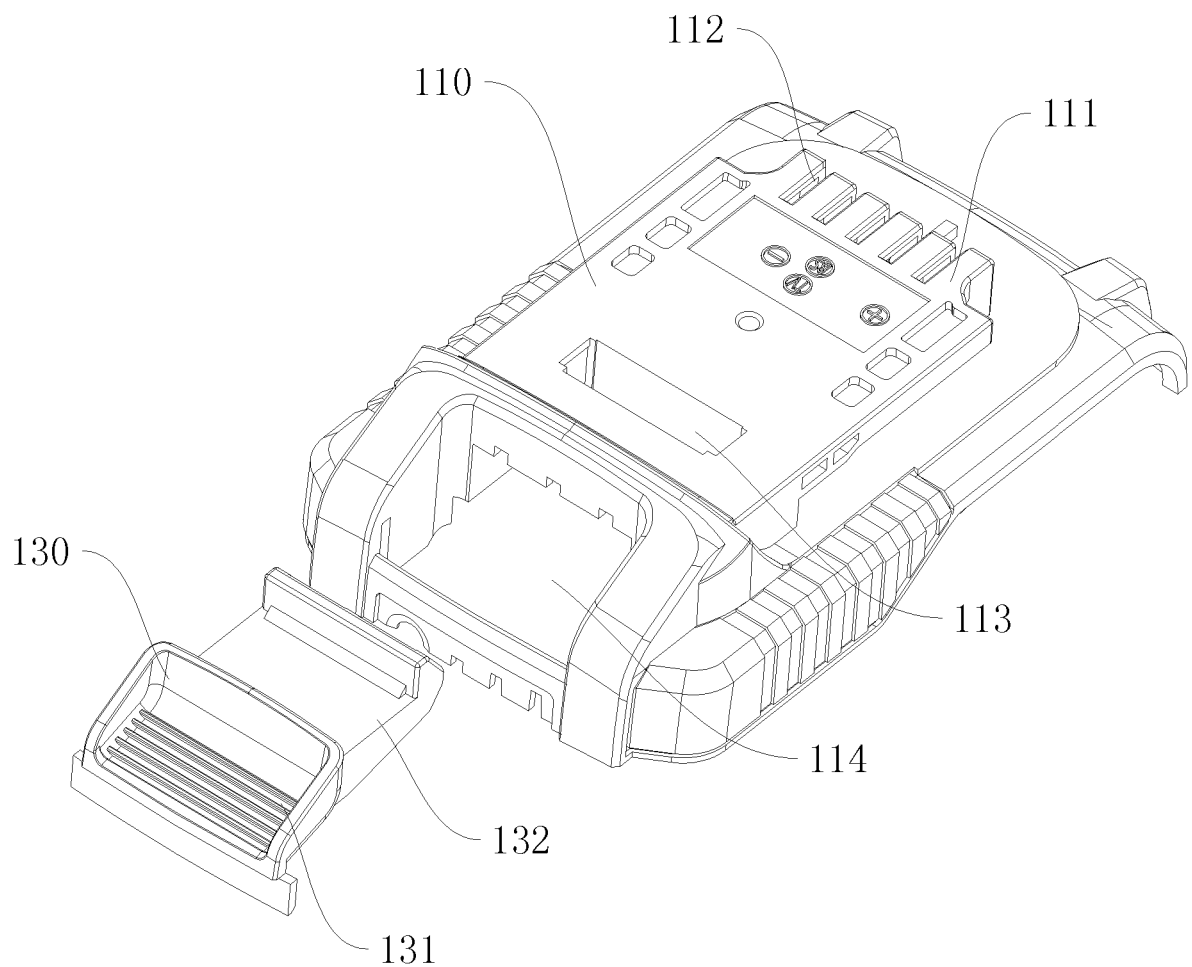
FIG. 8 is a structural schematic diagram of an upper housing of the present invention in an exploded state.

Referring to FIGS. 2 and 8, the upper housing 110 is further provided with a locking structure for locking an electric load. The locking structure comprises a locking port 113 opened in the top portion of the upper housing 110, a depressing port 114 opened at one side of the locking port 113, a locking member 130 that is used for locking the electric load and can be depressed conveniently, and a return spring 140 for returning the locking member 130. Here, the locking member 130 comprises a depressing plate 131 projecting beyond the upper housing 110 from the depressing port 114 and a locking hook 132 projecting from the locking port 113.

Figure 9:
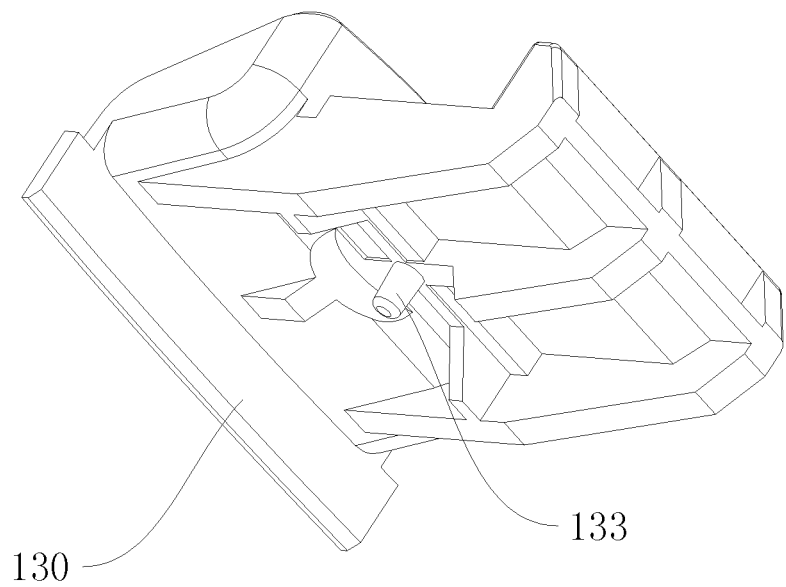
FIG. 9 is a structural schematic diagram of a locking member of the present invention.

Referring to FIGS. 4 and 9, the locking member 130 is further provided on a bottom portion thereof with a spring insertion post 133 for inserting into the return spring 140, and the lithium battery holder 200 is provided on the top portion thereof with a positioning groove 212 into which the return spring 140 (see FIG. 2) may be inserted.

Figure 10:
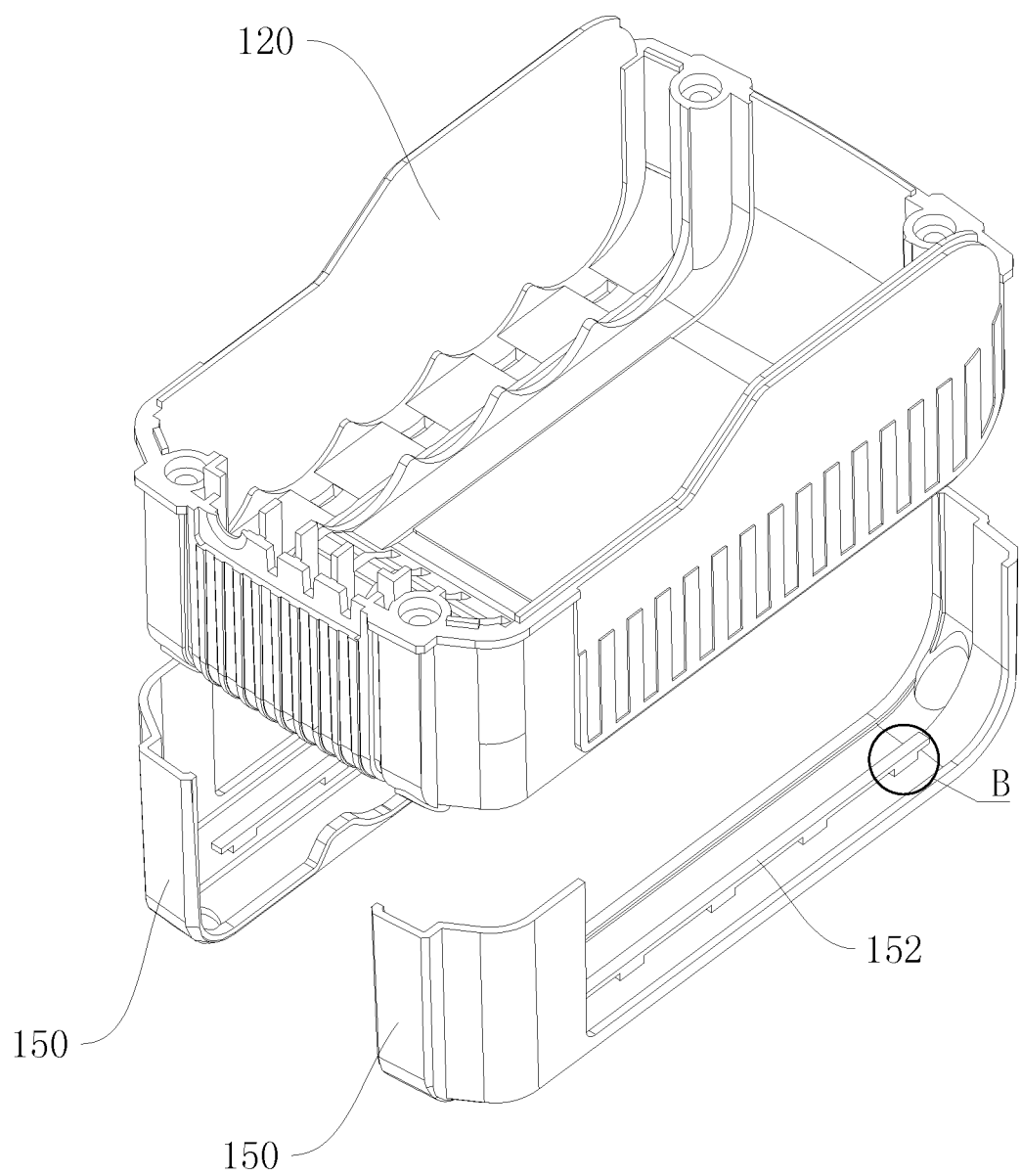
FIG. 10 is a structural schematic diagram of a lower housing of the present invention in an exploded state.
Figure 11:
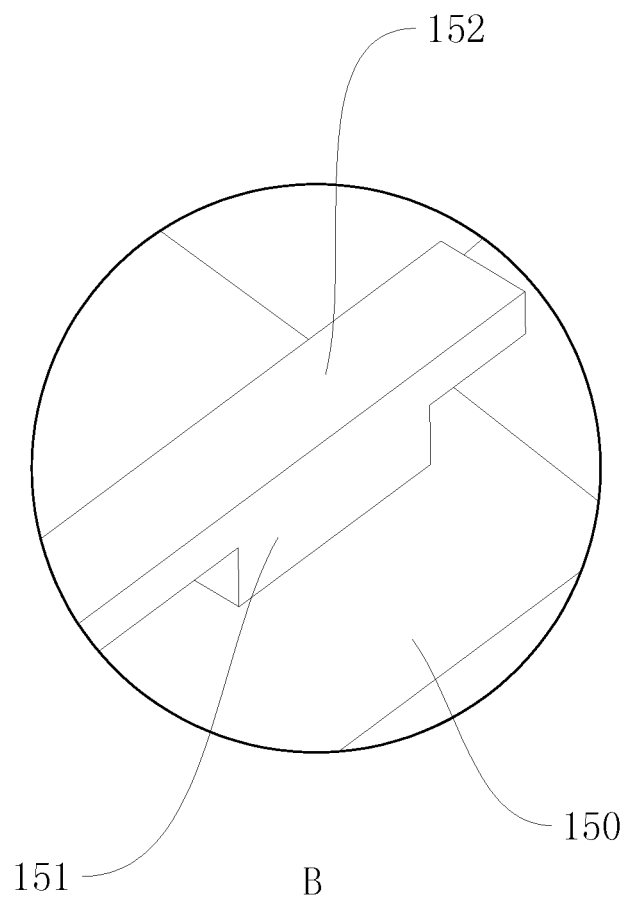
FIG. 11 is an enlarged diagram of Detail B in FIG. 10.
Figure 12:
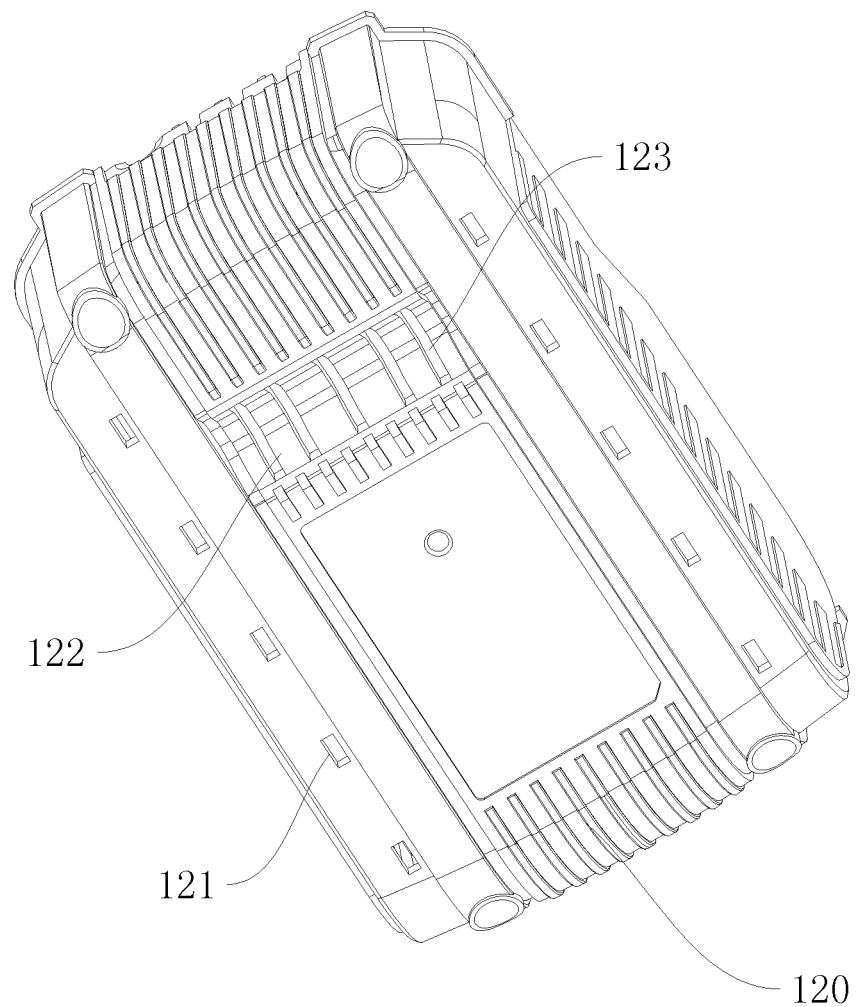
FIG. 12 is a structural schematic diagram of a bottom portion of the lower housing of the present invention.

Referring to FIGS. 10-12, two sides of a bottom portion of the lower housing 120 are each provided with a protective external shield 150, both sides of the bottom portion of the lower housing 120 are provided with at least two fixing through-holes 121, and the protective external shield 150 is provided with fixing blocks 151 corresponding one by one to the fixing through-holes 121 and extending therethrough and fixing bars 152 connected to top portions of the fixing blocks 151 and appressed to the inner bottom surface of the lower housing 120. In this embodiment, two sides of the bottom portion of the lower housing 120 are provided respectively with five fixing through-holes 121 that are regularly arranged along the length direction of the housing, and the fixing through-holes 121 all are square through-holes.

The lower housing 120 is further provided on the bottom portion thereof with a heat dissipation slot 122 formed by upward indentation, wherein the heat dissipation slot 122 is disposed along the width direction of the housing, and is also disposed to be directly opposite to the circuit board 400. The bottom surface of the heat dissipation slot 122 is further provided with heat dissipation ports 123 regularly along the width direction of the housing.

The present specific embodiments are to be construed as merely illustrative of the present invention, and not intended to constitute any limitations thereto. Upon reading this description, those skilled in the art may make amendments having no creative contribution to the present embodiments based on requirements, but all the amendments that fall within the scope as set forth in the claims of the present invention shall be protected by the Patent Law.

The invention claimed is:

1. A lithium battery package comprising a housing (100), a lithium battery pack and a circuit board (400), wherein the lithium battery pack comprises a lithium battery holder (200) and a number of lithium cells (300) mounted within the lithium battery holder (200), and two sides of the lithium battery holder (200) are mounted respectively with metal pin means (500) coupled with the lithium cells (300), characterized in that: the housing (100) is provided with a charging adaptor (111); a bottom portion at each side of the charging adaptor (111) is provided with a chute (115) along its length direction; a front end of the charging adaptor (111) is provided with six charging sockets (112); the housing (100) is further provided with a locking structure for locking an electric load, the six charging sockets (112) comprise a first socket (112*a*), a second socket (112*b*), a third socket (112*c*), a fourth socket (112*d*), a fifth socket (112*e*) and a sixth socket (112*f*), wherein the third socket (112*c*) and the fourth socket (112*d*) are disposed side by side in a vertical direction.

2. The lithium battery package of claim 1, characterized in that: a space between adjacent ones of the charging sockets (112) is 4.5 mm, the charging adaptor (111) has a width of 34.5 mm, and the chute (115) has a depth of 6.28 mm.

3. The lithium battery package of claim 1, characterized in that: the metal pin means (500) comprises a fixing plate (510) fixed to each side of the lithium battery holder (200), a plugging tab (520) connected with the circuit board (400) and a connection portion (530) connecting the fixing plate (510) and the plugging tab (520), wherein the circuit board (400) is provided with a plugging through-slot (440) into which the plugging tab (520) is inserted; the lithium battery holder (200) is further provided with a mounting base (209) for fixing the plugging tab (520), wherein the mounting base (209) is provided with a connection opening (209*a*) into which the connection portion (530) projects, and a tab limiting groove (209*b*) against which two sides of the plugging tab (520) abuts.

4. The lithium battery package of claim 3, characterized in that: the plugging tab (520) is provided on each side thereof with a lug (521) that abuts against both a top surface of the mounting base (209) and a bottom surface of the circuit board (400).

5. The lithium battery package of claim 1, characterized in that: the circuit board (400) is fixed at one side on a top portion of the lithium battery holder (200), and the metal pin means (500) comprises lateral pin elements that are located on two sides of the circuit board (400) and extending pin elements that are away from the two sides of the circuit board (400), wherein a connection portion (530) of each extending pin element is provided with a positioning through-hole (540), and a top portion of the lithium battery holder (200) is provided with a positioning insertion post (210) inserted into the limiting through-hole.

6. The lithium battery package of claim 2, characterized in that: on the top portion of the lithium battery holder (200), a srib plate (211) is provided on each side of the positioning insertion post (210) for abutting against a bottom portion of the extending pin element.

7. The lithium battery package of claim 1, characterized in that: the top portion of the lithium battery holder (200) is provided with at least two fixing studs (206), the circuit board (400) is provided with fixing through-holes (410) disposed directly opposite to the fixing studs (206), and the circuit board (400) is provided with fixing screws (420) mated with the fixing studs (206) so as to achieve the fixing of the circuit board (400) on the top portion of the lithium battery holder (200).

8. The lithium battery package of claim 4, characterized in that: the lithium battery holder (200) is further provided with a number of posts (207) for abutting against the bottom surface of the circuit board (400), wherein a top portion of each post (207) is provided with a positioning post (208), the circuit board (400) is provided with a positioning hole (430) into which the positioning post (208) is inserted.

9. The lithium battery package of claim 1, characterized in that: at least one of the metal pin means (500) is made from a low-melting-point alloy, and said metal pin element (500) is provided at the connection portion (530) thereof with a fuse through-hole (503a).

* * * * *